United States Patent
DeCamp et al.

[19]

[11] Patent Number: 6,157,873
[45] Date of Patent: Dec. 5, 2000

[54] ROBOT PROGRAMMING SYSTEM AND METHOD

[75] Inventors: William Harold DeCamp, Cincinnati; Brendan John Comerford, Yellow Springs; Gregory Webb, Springfield, all of Ohio

[73] Assignee: Motoman, Inc., West Carrollton, Ohio

[21] Appl. No.: 09/057,876

[22] Filed: Apr. 9, 1998

[51] Int. Cl.[7] .................................................. G06F 19/00
[52] U.S. Cl. ......................... 700/253; 700/245; 700/186
[58] Field of Search .................................... 700/160, 166, 700/86, 184, 186, 187, 245, 253, 258, 264; 318/567, 568.1, 568.11, 568.13, 568.16, 568.25; 600/429, 417

[56] References Cited

U.S. PATENT DOCUMENTS

| | | | |
|---|---|---|---|
| 4,998,050 | 3/1991 | Nishiyama et al. | 700/248 |
| 5,046,022 | 9/1991 | Conway et al. | 700/250 |
| 5,047,700 | 9/1991 | Szakaly | 318/568.1 |
| 5,053,975 | 10/1991 | Tsuchihashi et al. | 700/264 |
| 5,105,367 | 4/1992 | Tsuchihashi et al. | 700/264 |
| 5,274,750 | 12/1993 | Shiina et al. | 700/264 |
| 5,488,689 | 1/1996 | Yamato et al. | 700/264 |
| 5,495,410 | 2/1996 | Graf | 700/86 |
| 5,511,147 | 4/1996 | Abdel-Malek | 700/264 |
| 5,617,515 | 4/1997 | MacLaren et al. | 700/264 |
| 5,910,894 | 6/1999 | Pryor | 700/95 |

OTHER PUBLICATIONS

"The FaroArm Convertible™ The Best of FARO Converted into ONE Fantastic Arm!" © 1997 FARO Technologies, Inc.
Preliminary Product Data Sheet—Image Guided Technologies, Inc., Nov. 11, 1996.
Solutions in Motion®, ROTSY, ©1996 Motoman, Inc., Oct. 1996.

*Primary Examiner*—William Grant
*Assistant Examiner*—Kidest Bahta
*Attorney, Agent, or Firm*—Killworth, Gottman, Hagan & Schaeff, L.L.P.

[57] ABSTRACT

A robot programming system is provided comprising a simulated work cell configuration, a tool position and orientation sensor assembly, and a programing computer. The simulated work cell configuration includes a tangible artificial tool and a tangible artificial workpiece, wherein the position and orientation of the artificial tool relative to the workpiece is variable. The sensor assembly is operative to sense the position and the orientation of the artificial tool. The programming computer is in communication with the sensor assembly and is programmed to (i) display a variable virtual robot configuration based upon the sensed position and orientation of the artificial tool, (ii) receive discrete artificial tool positions and orientations from the sensor assembly, and (iii) create a robot job data file including the discrete artificial tool positions and orientations.

28 Claims, 4 Drawing Sheets

ROBOT PROGRAMMING SYSTEM AND METHOD

BACKGROUND OF THE INVENTION

The present invention relates to robot programming and teaching systems and, more particularly, to a robot programming system that provides a more accurate and efficient programming routine that is particularly well suited for off-line robot teaching systems.

Yamato et al., U.S. Pat. No. 5,488,689, the disclosure of which is incorporated herein by reference, relates to a robot operation training system wherein robot training may be started before the actual robot is manufactured or installed. The robot training system has a controller substantially the same as the actual robot controller and a personal computer for simulating the functions of the robot body. The functions to be performed by the robot are simulated by replacing the robot with the personal computer. The present inventor has, however, recognized that the Yamato et al. system is likely to be difficult to operate and inefficient because of the inherent limitations presented by replacing the tangible robot itself with a simulated robot displayed on a computer screen.

MacLaren et al., U.S. Pat. No. 5,617,515, the disclosure of which is incorporated herein by reference, teaches a system for controlling and programming a robot wherein a hand-held controller wand is utilized to provide an intuitive control input for real-time direction and programming of robot movement. The present inventor has, however, recognized that the MacLaren et al. system is likely to be difficult to operate accurately because a user must view the motion of a peripheral device, e.g., an end effector of an actual robot, to monitor how the movement of the controller wand translates into movement of a robot tool. Specifically, the user must move the controller wand while viewing the end effector of the robot to observe the correlation between the movement of the controller wand and an actual robot tool. Thus, direct visual contact of the controller wand must be continuously interrupted to monitor the movement of a robot tool in a robot configuration. The present inventor has recognized that the MacLaren et al. system is likely to lack reliability and be difficult to operate because the user is forced to rely solely upon visual observation of the peripheral device to position the robot tool. The controller wand itself does not provide an accurate indication of the manner in which the robot tool has been positioned. Finally, the present inventor has recognized that the MacLaren et al. system is likely to lack reliability and be difficult to operate because the position, and thus the translation, of the controller wand is not sensed. Rather, the roll, pitch, and yaw data of the controller wand are the only variables sensed by the system. The user is required to activate a button on the wand itself to represent translation of the controller wand. Specifically, although the roll, pitch, and yaw of the controller are sensed by conventional angular rate sensors, the actual position and translation of the controller wand is not monitored. The user induces translation of the robot's end effector by pointing the wand in a preferred direction and engaging a button on the controller wand.

Accordingly, there is a need for a robot programming system and method that provide a more accurate and efficient programming routine that is particularly well suited for off-line robot teaching systems, that does not merely replace the tangible robot with a simulated robot displayed on a computer screen, that does not require the user to view a peripheral device to monitor the movement of the controller wand, that does not force the user to rely solely upon visual observation of the peripheral device to position the robot tool, and that is not limited to sensing merely the orientation of a hand held controller.

BRIEF SUMMARY OF THE INVENTION

This need is met by the present invention wherein a robot programming system is provided comprising a simulated work cell configuration including a tangible artificial tool and a tangible artificial workpiece, a tool position and orientation sensor assembly, and a programing computer programmed to display a variable virtual robot configuration based upon the sensed position and orientation of the artificial tool and create a robot job data file from discrete artificial tool positions and orientations received from the sensor assembly.

In accordance with one embodiment of the present invention, a robot programming system is provided comprising a simulated work cell configuration, a tool position and orientation sensor assembly, and a programing computer. The simulated work cell configuration includes a tangible artificial tool and a tangible artificial workpiece, wherein the position and orientation of the artificial tool relative to the workpiece is variable. The sensor assembly is operative to sense the position and the orientation of the artificial tool. The programming computer is in communication with the sensor assembly and is programmed to (i) display a variable virtual robot configuration based upon the sensed position and orientation of the artificial tool, (ii) receive discrete artificial tool positions and orientations from the sensor assembly, and (iii) create a robot job data file including the discrete artificial tool positions and orientations.

Preferably, the programming computer is further programmed to display the variable virtual robot configuration substantially in real time relative to movement of the artificial tool. The programming computer may also be programmed such that the virtual robot configuration includes a virtual representation of a robot tool and an associated virtual representation of a workpiece. Additionally, the programming computer may be programmed to create the robot job data file by identifying the discrete artificial tool positions and orientations. Also, the programming computer may be programmed to associate path types with movement of the artificial tool from a first discrete point to a second discrete point. Preferably, the programming computer is programmed to enable transmission of the robot job data file to the controller of a robot and to permit modification of the robot job data file, including modification of the discrete artificial tool positions, orientations, and functions. The additional robot functions may include arc-on and arc-off commands for a robot-mounted welding device. Finally, the programming computer may be operative to display the variable virtual robot configuration and create the robot job data file off line from a robot to be programmed.

The sensor assembly may be operative to sense the position and the orientation of the artificial tool independent of the rate at which the artificial tool is moved. Preferably the sensor assembly is arranged to sense the position of the artificial tool in three orthogonal dimensions and to sense the orientation of the artificial tool in terms of the degree of rotation of the artificial tool about each of the three orthogonal dimensions.

The sensor assembly may comprise: at least one electromagnetic source mounted to the artificial tool; at least one electromagnetic sensor fixed relative to a sensor assembly frame of reference and positioned to receive electromagnetic radiation from the at least one electromagnetic source; and a sensor assembly controller operative to convert the received electromagnetic radiation to a artificial tool position/orientation signal. The sensor assembly may be further responsive to an array of electromagnetic sources mounted to the workpiece. Alternatively, the sensor assembly may comprise a measurement arm and the artificial tool may be mounted to the measurement arm.

The simulated work cell configuration may further include a mounting structure arranged to fix the position and orientation of the artificial workpiece relative to a teaching reference frame. The mounting structure may be arranged to fix the position and orientation of an actual workpiece relative to a robot reference frame such that the position and orientation of the artificial workpiece relative to the teaching reference frame corresponds to the position and orientation of the actual workpiece relative to the robot reference frame.

The robot programming system may further comprise a position and orientation selector operative to designate the discrete artificial tool positions and orientations for transfer to the programming computer. The selector may comprise an electronic switch incorporated in the sensor assembly. The artificial tool may include a physical representation of a robot tool control point.

In accordance with another embodiment of the present invention, an off-line robot programming system is provided comprising a teaching reference frame, a simulated work cell configuration, a sensor assembly, and a programming computer. The simulated work cell configuration includes a tangible artificial tool, wherein the position and orientation of the artificial tool relative to the teaching reference frame is variable. The sensor assembly is operative to sense the position and the orientation of the artificial tool relative to the teaching reference frame. The programming computer is in communication with the sensor assembly and is programmed to: display a variable virtual robot configuration based upon the sensed position and orientation of the artificial tool, receive discrete artificial tool positions and orientations from the sensor assembly, and create a robot job data file including the discrete artificial tool positions and orientations.

In accordance with yet another embodiment of the present invention, a method for programming a robot off-line is provided comprising the steps of: positioning and orienting a tangible artificial tool relative to a tangible artificial workpiece in a simulated work cell configuration so as to define a varying artificial tool position and orientation; sensing the varying artificial tool position and orientation, wherein the varying artificial tool position and orientation includes discrete artificial tool positions and orientations; displaying a variable virtual robot configuration based upon the sensed position and orientation of the artificial tool; receiving the discrete artificial tool positions and orientations from the sensor assembly; creating a robot job data file including the discrete artificial tool positions and orientations; and enabling transmission of the robot job data file to the controller of a robot.

The displaying step may be further characterized by display of the variable virtual robot configuration substantially in real time relative to movement of the artificial tool. The step of displaying the virtual robot configuration may include displaying a virtual representation of a robot tool and an associated virtual representation of a workpiece. The method may further comprise the step of designating the discrete artificial tool positions and orientations for transfer to the programming computer by activating a position and orientation selector. The discrete artificial tool positions and orientations preferably represent a succession of robot tool positions and orientations necessary for completion of a robot job.

The method may further comprise the steps of: providing a mounting structure; fixing the position and orientation of the artificial workpiece relative to a teaching reference frame via the mounting structure; transferring the mounting structure to a robot reference frame; fixing the position and orientation of the mounting structure to the robot reference frame; and securing an actual workpiece to the mounting structure such that the position and orientation of the artificial workpiece relative to the teaching reference frame corresponds to the position and orientation of the actual workpiece relative to the robot reference frame.

Accordingly, it is an object of the present invention to provide a robot programming system and method that provides an accurate and efficient programming routine that is particularly well suited for off-line robot teaching systems. Further, it is an object of the present invention to provide a robot programming system that utilizes a simulated work cell configuration including a tangible artificial tool and a tangible artificial workpiece, wherein a user can view and handle the simulated work cell configuration itself to monitor the movement of the artificial tool such that the user is not forced to rely solely upon visual observation of a peripheral device to position the artificial tool. Finally, it is an object of the present invention to provide a robot programming system that is capable of sensing the position and orientation of a tangible artificial tool within a simulated work cell configuration. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like stricture is indicated with like reference numerals and in which.

DETAILED DESCRIPTION OF THE PREFERRED EMBODIMENTS

Figure 1:
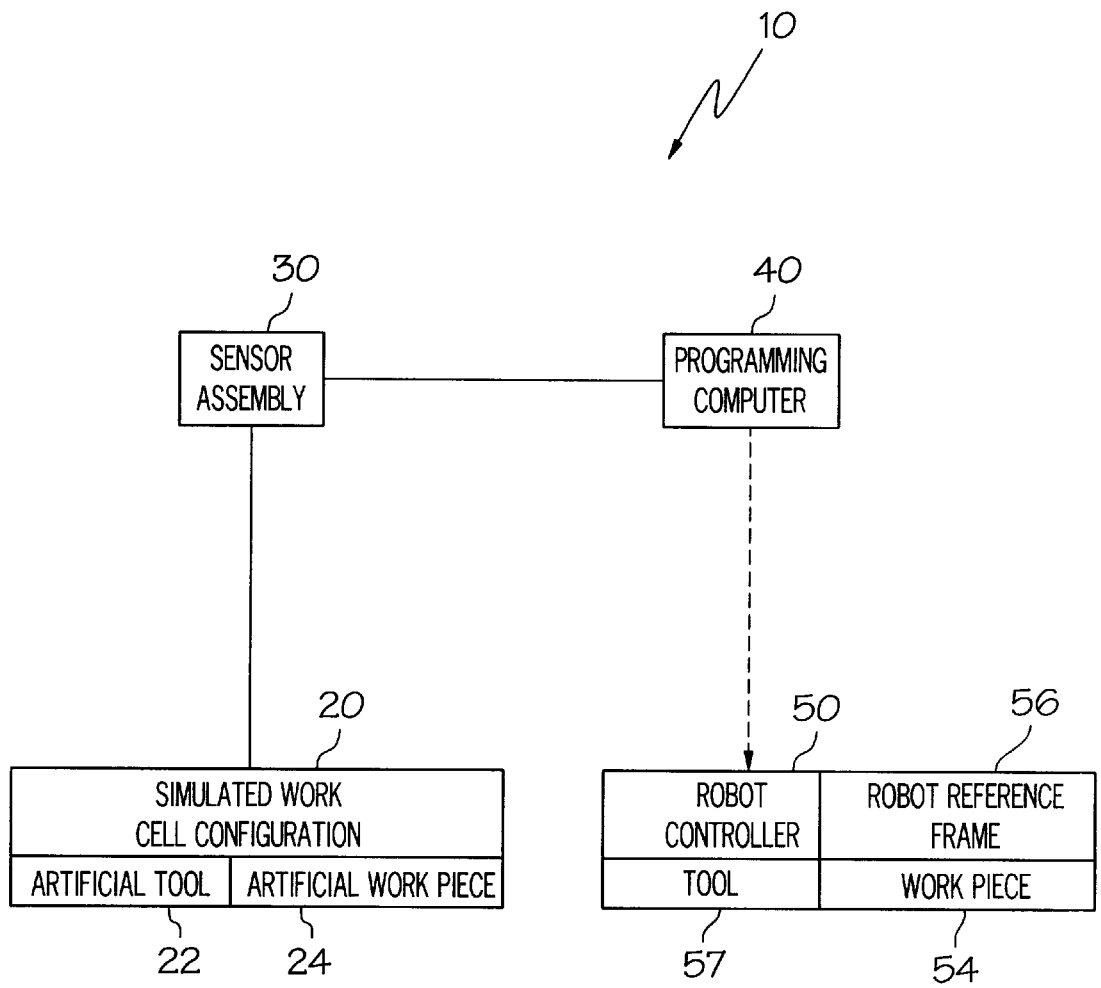
FIG. 1 is a schematic block diagram of a robot programming system according to the present invention.

A robot programming system 10 according to the present invention is illustrated in FIG. 1 and comprises a simulated work cell configuration 20, a sensor assembly 30, and a programming computer 40. The programming system 10 may be coupled to or in communication with a remote robot controller 50. The simulated work cell configuration 20 includes a tangible artificial tool 22 and a tangible artificial workpiece 24. For the purposes of describing and defining the present invention it should be understood that an object identified herein as a tangible object is an object that may be physically handled by a system user. An object that is merely displayed on a computer screen, for example, is not a tangible object. Similarly, an artificial object is an object that possesses physical qualities that are similar to a corresponding actual object. For example, in the context of the present invention, where an actual robot tool comprises a welding device, the artificial tool may be an elongate metal rod with a pointed tip. In various embodiments of the present invention, the artificial tool 22 is physically similar to an arc welding assembly, a laser tool, a materials dispensing device, a water jet cutting device, etc.

The position and orientation of the tangible artificial tool 22 relative to the tangible artificial workpiece 24 is variable. Specifically, referring to the embodiment of FIG. 2, the artificial tool 22 has a size and weight conducive to manual manipulation and is coupled to a sensor assembly controller 32 via a flexible electrical wire 26 that serves as a power supply connection to the tool 22.

In one embodiment of the present invention, the artificial tool 22 includes a physical representation of a robot tool control point 46, also referred to as a robot tool center point. Specifically, referring to the embodiment of the present invention illustrated in FIG. 2, the physical representation of a robot tool control point 46 comprises a pointed tip designed to represent the welding electrode of an arc welding device. This feature of the present invention enables more accurate robot programming because the specific control point, e.g., the welding electrode, is precisely defined by the physical representation 46 on the artificial tool 22.

The sensor assembly 30 is operative to sense the position and the orientation of the artificial tool 22. In one embodiment of the present invention the sensor assembly 30 may be provided with means to sense the position and orientation of the artificial tool 22 and the position of the artificial workpiece 24. In this manner, the sensor assembly 30 would provide an indication of the position and orientation of the artificial tool 22 relative to the artificial workpiece 24, even if the artificial workpiece 24 is moved from its home position. Two commercially available sensor assemblies are particularly well suited for use in the present invention: the Pixsys™ 3-D Digitizer System from Image Guided Technologies, Inc., Boulder, Colo.; and the FaroArm Convertible™ measurement arm from Faro Technologies, Inc., Lake Mary, Fla.

The sensor assembly 30 of the present invention is arranged to sense the position of the artificial tool 22 in three orthogonal dimensions and to sense the orientation of the artificial tool 22 in terms of the degree of rotation of the artificial tool 22 about each of the three orthogonal dimensions. Accordingly, the sensor assembly 30 comprises a six degrees of freedom sensing arrangement and is operative to sense the position and the orientation of the artificial tool 22 independent of the rate at which the artificial tool 22 is moved.

Figure 2:
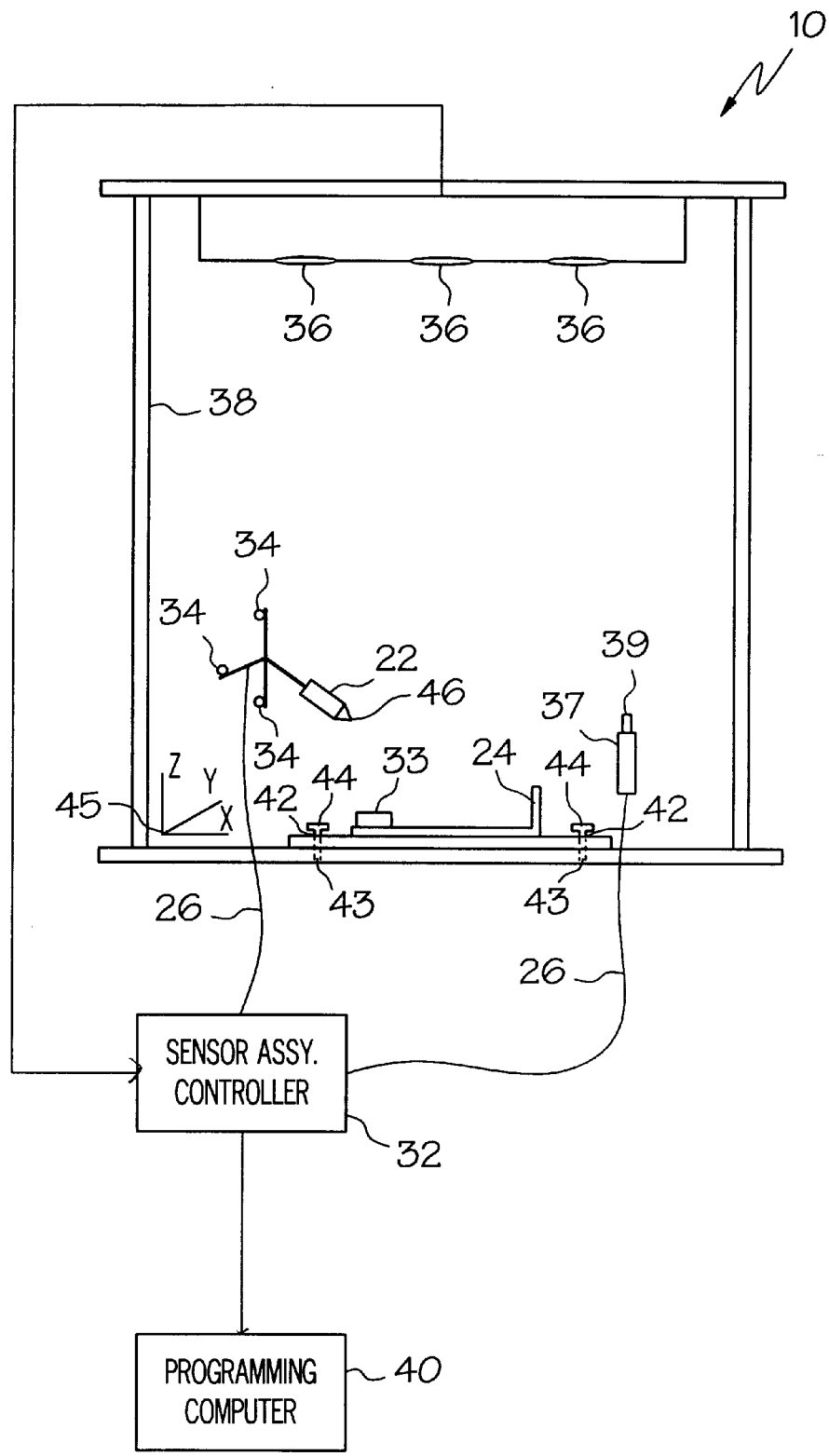
FIGS. 2 and 3 are a schematic illustrations of respective robot programming systems including detailed views of two different types of sensor assembly arrangements according to the present invention.

Referring now to FIG. 2, the embodiment of the present invention incorporating the Pixsys™ 3-D Digitizer System is illustrated. The sensor assembly 30 comprises a plurality of electromagnetic sources 34 mounted to the tangible artificial tool 22 and an array of electromagnetic sensors 36 fixed to a sensor assembly frame of reference 38. The sensors 36 are positioned to receive electromagnetic radiation from the electromagnetic sources 34. The sensor assembly controller 32 is operative to convert the received electromagnetic radiation to a artificial tool position/orientation signal through conventional techniques of geometric triangulation. As is noted above, the sensor assembly 30 may further incorporate an array of electromagnetic sources 33 mounted to the artificial workpiece 24 to enable a user to monitor the position and orientation of the artificial tool 22 relative to the artificial workpiece 24.

Referring to FIGS. 1 and 2, in one embodiment of the present invention, the simulated work cell configuration 20 further includes a mounting structure 48 arranged to fix the position and orientation of the artificial workpiece 24 relative to a teaching reference frame 45. Further, the mounting structure 48 is arranged to fix the position and orientation of an actual workpiece 54 relative to a robot reference frame 56 such that the position and orientation of the artificial workpiece 24 relative to the teaching reference frame 45 corresponds to the position and orientation of the actual workpiece 54 relative to the robot reference frame 56. Specifically, the mounting structure 48 comprises a pair of mounting bores 42 formed therein. The mounting bores 42 are positioned to match-up with a pair of complementary mounting bores or slots 43 formed in a teaching platform 47. A pair of mounting bolts 44 are designed and positioned to secure the mounting structure to the teaching platform 47 via the mounting bores 42 and the complementary mounting bores or slots 43. In this manner, the artificial workpiece 24 is fixed to the teaching platform 47 in a predetermined fixed relationship relative to the teaching reference frame 45. The robot reference frame 56 includes complementary mounting holes (not shown) that are positioned in the same predetermined fixed relationship with respect to the robot reference frame 56. Thus, the mounting structure 48 may be transferred to the robot reference frame 56 and fixed relative to the robot reference frame 56 such that its position and orientation relative to the robot reference frame is substantially identical to its position and orientation relative to the teaching reference frame 45.

Figure 3:
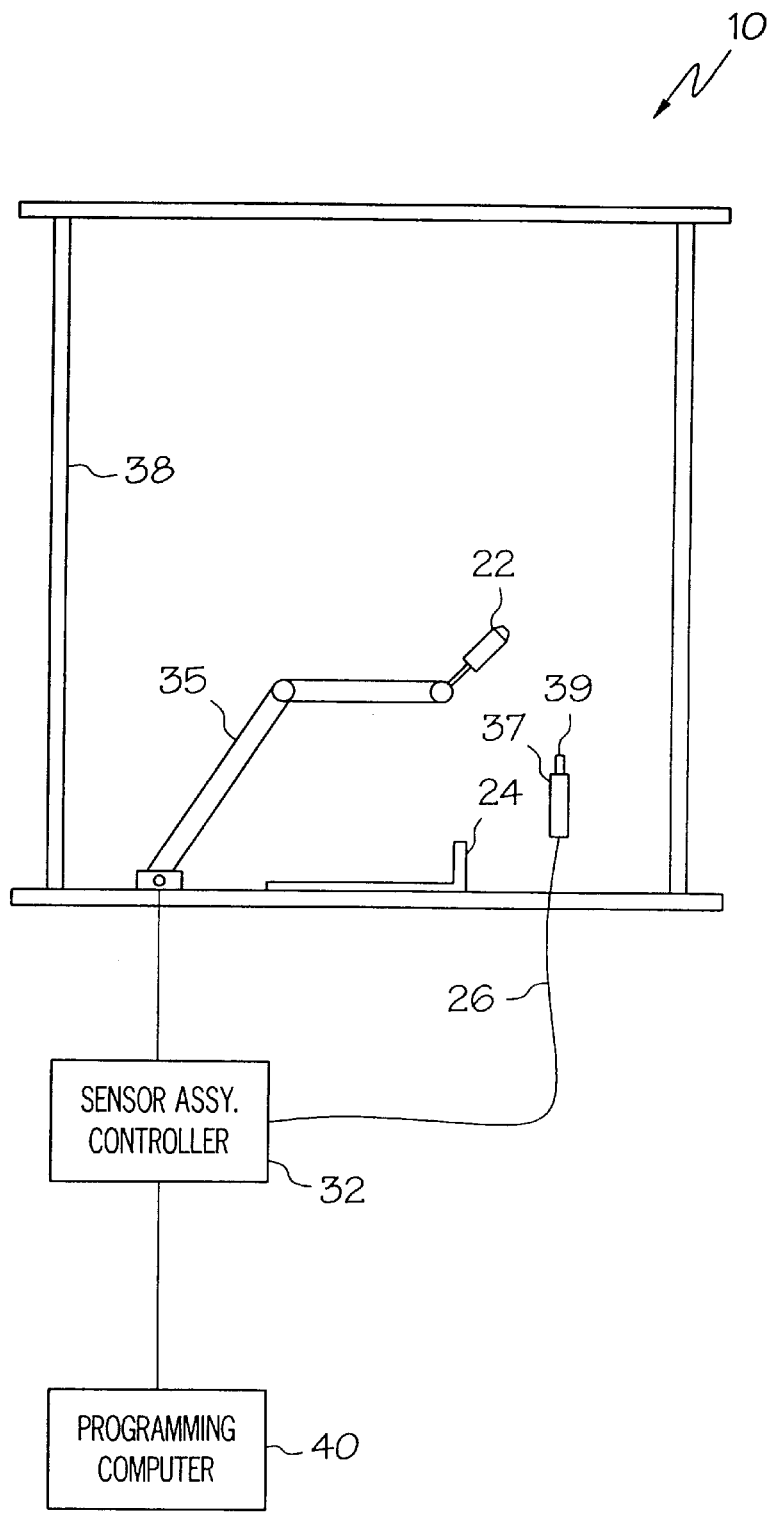

Referring now to FIG. 3, the embodiment of the present invention incorporating a six degrees of freedom measurement arm is illustrated. The sensor assembly 30 comprises a measurement arm 35 and the artificial tool 22 is mounted to the measurement arm 35. Encoders (not shown) are incorporated into the measurement arm design to provide respective indications of the position and orientation of the tangible artificial tool 22 secured to the measurement arm 35. The operation of the sensor assembly controller 32 is substantially the same as described above with reference to FIG. 2 and converts the encoder data to position and orientation data for transfer to the programming computer 40.

The programming computer 40 is in communication with the sensor assembly 30 and is programmed to display a variable virtual robot configuration based upon the sensed position and orientation of the artificial tool 22. The virtual robot configuration includes a virtual representation of an actual robot tool, an associated virtual representation of an actual workpiece, and a graphic display of a robot in a particular work environment. The work environment would include any physical objects in the proximity or range of the robot arm, e.g., an actual robot tool, an actual workpiece, a robot arm, structural support members, etc. The variable configuration is displayed substantially in real time relative to the movement of the artificial tool 22 with ordinary delays attributable to the processing speed of the programming computer 40.

The virtual display capability enables a user to monitor the movement of an actual robot arm, in a virtual display, as the user manipulates the artificial tool 22 relative to the artificial workpiece. Collisions and interferences may conceivably exist between a robot tool and the robot arm, between the robot arm and a workpiece, between the robot tool and the workpiece, between the robot and objects in its vicinity, etc. A variety of path limitations may be inherent in the design of a robot arm itself. Thus, the present invention allows a user to detect the collisions, interferences, and path limitations associated with of a variety of potential tool paths within a specific robot configuration.

The programming computer 40 includes a monitor and associated hardware and software for providing the virtual display described herein. For the purposes of describing and defining the present invention, it should be understood that the programming computer 40 may comprise any computer capable of performing the operations described herein, e.g., a computer system operating on a PC platform.

It is contemplated by the present invention that any one of a variety of robot programming software packages may be employed to enable the programming computer 40 to perform the operations described herein. One example of such a software package is a modified version of ROTSY, available from Motoman, Inc., West Carrolton, Ohio. ROTSY is a robot application development program that allows a user to view a virtual robot system through a high-resolution three-dimensional surface display. Robot translation, orientation, and other job steps can be instructed with the ROTSY software and displayed on the computer screen. A data file including these job steps is created in ROTSY and may be downloaded to the controller of a robot. According to the present invention, this version of ROTSY is modified to accept translation, orientation, and other job data from the external sensor assembly 30. As will be appreciated by those of ordinary skill in the art of computer programming, an appropriate communication protocol is arranged, in view of the particular specifications of the sensor assembly 30 and the programming computer 40, to coordinate the transfer of the job data from the sensor assembly 30 to the programming computer 40. The particular features of the communications protocol are also dependent upon the specifications of the programming computer's operating software. ROTSY is particularly well suited for use in the present invention because its operational software is designed to process position and orientation data of a robot tool. Thus, it may be conveniently modified to accept the position and orientation data from an external source, i.e., the sensor assembly 30, through configuration of an appropriate communications protocol.

The programming computer 40 is also programmed to receive discrete artificial tool positions and orientations from the sensor assembly 30 and create a robot job data file including the discrete artificial tool positions and orientations. The discrete positions and orientations are identified from the positions and orientations sensed by the sensor assembly 30 and received by the programming computer 40. In one embodiment of the present invention, the robot programming system 10 is provided with a position and orientation selector 37 that is operative to designate the discrete artificial tool positions and orientations for transfer to the programming computer 40. The discrete positions and orientations are selected by engaging an electronic switch 39 incorporated in the selector 37. Preferably, the selector 37 is coupled to the sensor assembly controller 32 via a flexible electrical wire 26 to enhance the ease at which the robot programming system 10 may be operated.

The programming computer 40 is further programmed to create the robot job data file by associating a path type with movement of the artificial tool 22 from a first discrete point to a second discrete point and between successive discrete points. Particular path types include linear, joint, and curved path types, where a linear path represents linear movement from one point to the next, a joint path type represents simultaneous movement along all axes from one point to the next, and a curved path represents a path of movement defining a curve. The programming computer 40 is further programmed to enable transmission of the robot job data file to the remote robot controller 50 to complete the programming sequence of the present invention. As will be appreciated by those practicing the present invention, transmission may be enabled by saving the job data file on a transportable memory storage device, by preparing the job data file for transfer via a direct communications link, etc.

In one embodiment of the present invention, the programming computer 40 is further programmed to permit modification of the robot job data file. In this manner, a user may change, add or delete some of the discrete artificial tool positions and orientations without the use of the artificial tool 22 and the sensor assembly 30. Additionally, the programming computer 40 is further programmed to permit a user to associate specific additional robot functions with the discrete artificial tool positions and orientations, e.g., "arc-on" and "arc-off" commands for a robot-mounted welding device, a path type command, a tool speed command, and a destination proximity command, etc.

Figure 4:
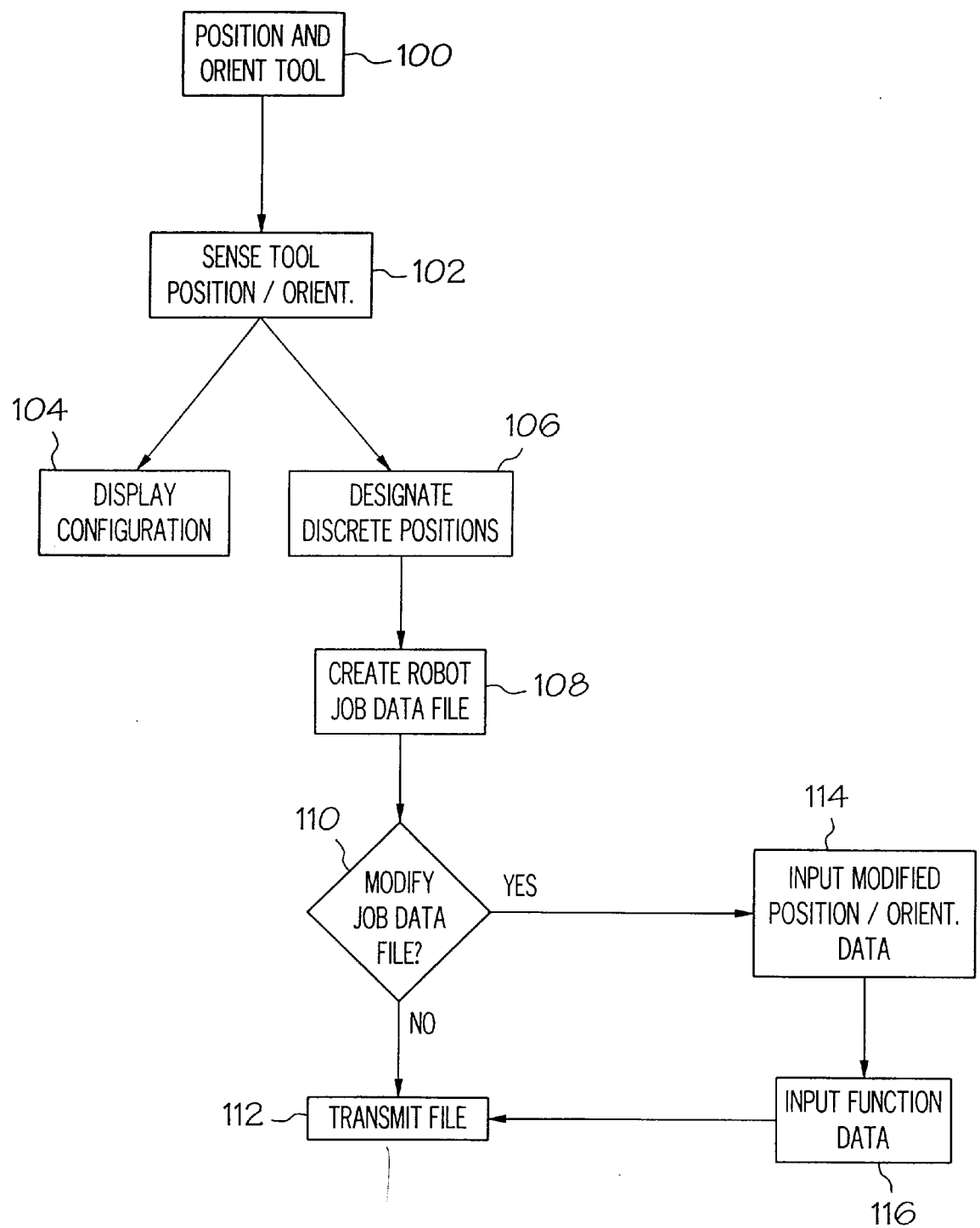
FIG. 4 is a flow chart illustrating a robot programming method of the present invention.

An operational sequence according to one embodiment of the present invention is illustrated in FIG. 4, with additional reference to FIGS. 1–3. Initially, the tangible artificial tool 22 is positioned and oriented relative to the tangible artificial workpiece 24 in the simulated work cell configuration 20 so as to define a varying artificial tool position and orientation, see step 100. The sensor assembly 30 senses the varying artificial tool position and orientation, see step 102, and a variable virtual robot configuration is displayed at the programming computer 40 based upon the sensed position and orientation of the tangible artificial tool 22, see step 104. The displaying step occurs substantially in real time relative to movement of the tangible artificial tool 22 in the simulated configuration. Preferably, an associated virtual representation of an actual workpiece is displayed with the virtual representation of an actual robot tool.

Discrete artificial tool positions and orientations included within the varying artificial tool position and orientation are designated for transfer to the programming computer 40 by activating the position and orientation selector 37, see step 106. The discrete artificial tool positions and orientations represent a succession of robot tool positions and orientations necessary for completion of a robot job. The discrete artificial tool positions and orientations are received by the programming computer 40 from the sensor assembly 30 and a robot job data file including the discrete artificial tool positions and orientations is created by the programming computer 40, see step 108. If a user does not wish to modify the job data file, see step 110, then the robot job data file is transferred or transmitted to the controller of a robot by saving the file on a transportable memory storage device or transferring the file via a direct communications link, see step 112. If modification is desired, see step 110, the user is prompted to input modified position and orientation data and any associated function data, e.g., "arc on/off", prior to transmission of the job data file to the controller of a robot, see steps 114 and 116.

Accordingly, the robot programming system 10 of the present invention enables accurate and efficient programming that is particularly well suited for off-line robot teaching systems. Further, the robot programming system 10 of the present invention utilizes a simulated work cell configuration 20 including a tangible artificial tool 22 and a tangible artificial workpiece 24, wherein a user can view and handle the simulated work cell configuration 20 itself to monitor the movement of the artificial tool 22 such that the user is not forced to rely solely upon visual observation of a peripheral device to position the artificial tool 22. Finally, the robot programming system 10 of the present invention is capable of sensing the position and orientation of the tangible artificial tool 22 within a simulated work cell configuration 20.

Having described the invention in detail and by reference to preferred embodiments thereof, it will be apparent that modifications and variations are possible without departing from the scope of the invention defined in the appended claims. For example, the present invention has been illustrated with reference to relatively simple robot configurations and jobs and it is contemplated by the present invention that more complex arrangements, tool translation, and robot functions may be incorporated into the robot programming system of the present invention.

What is claimed is:

1. A robot programming system comprising:
   a simulated work cell configuration including a tangible artificial tool, a tangible artificial workpiece, and a mounting structure wherein
      the position and the orientation of said artificial tool relative to said workpiece is variable,
      said mounting structure is arranged to fix the position and orientation of said artificial workpiece relative to a teaching reference frame, and
      said mounting structure is further arranged to fix the position and orientation of an actual workpiece relative to a robot reference frame such that the position and orientation of said artificial workpiece relative to said teaching reference frame corresponds to the position and orientation of said actual workpiece relative to said robot reference frame;
   a sensor assembly operative to sense said position and said orientation of said artificial tool; and
   a programming computer in communication with said sensor assembly and programmed to
      display a variable virtual robot configuration based upon the sensed position and orientation of said artificial tool,
      receive discrete artificial tool positions and orientations from said sensor assembly, and
      create a robot job data file including said discrete artificial tool positions and orientations.

2. A robot programming system as claimed in claim 1 wherein said programming computer is further programmed to display said variable virtual robot configuration substantially in real time relative to movement of said artificial tool.

3. A robot programming system as claimed in claim 1 wherein said programming computer is further programmed such that said virtual robot configuration includes a virtual representation of a robot tool and an associated virtual representation of a workpiece.

4. A robot programming system as claimed in claim 1 wherein said programming computer is further programmed to create said robot job data file by associating a path type with movement of said artificial tool from a first discrete point to a second discrete point.

5. A robot programming system as claimed in claim 1 wherein said programming computer is further programmed to enable transfer of said robot job data file to the controller of a robot.

6. A robot programming system as claimed in claim 1 wherein said programming computer is further programmed to permit modification of said robot job data file.

7. A robot programming system as claimed in claim 6 wherein said modification includes modification of said discrete artificial tool positions and orientations.

8. A robot programming system as claimed in claim 7 wherein said modification includes specification of additional robot functions associated with said discrete artificial tool positions and orientations.

9. A robot programming system as claimed in claim 8 wherein said additional robot functions include arc-on and arc-off commands for a robot-mounted welding device, a path type command, a tool speed command, and a destination proximity command.

10. A robot programming system as claimed in claim 1 wherein said sensor assembly is operative to sense said position and said orientation of said artificial tool independent of the rate at which said artificial tool is moved.

11. A robot programming system as claimed in claim 1 wherein said sensor assembly is arranged to sense the position of said artificial tool in three orthogonal dimensions and to sense the orientation of said artificial tool in terms of the degree of rotation of said artificial tool about each of the three orthogonal dimensions.

12. A robot programming system comprising:
   a simulated work cell configuration including a tangible artificial tool and a tangible artificial workpiece, wherein the position and the orientation of said artificial tool relative to said workpiece is variable;
   a sensor assembly operative to sense said position and said orientation of said artificial tool wherein said sensor assembly comprises
      at least one electromagnetic source mounted to said artificial tool,
      at least one electromagnetic sensor fixed relative to a sensor assembly frame of reference and positioned to receive electromagnetic radiation from said at least one electromagnetic source, and
      a sensor assembly controller operative to convert said received electromagnetic radiation to a artificial tool position/orientation signal; and
   a programming computer in communication with said sensor assembly and programmed to
      display a variable virtual robot configuration based upon the sensed position and orientation of said artificial tool,
      receive discrete artificial tool positions and orientations from said sensor assembly, and
      create a robot job data file including said discrete artificial tool positions and orientations.

13. A robot programming system as claimed in claim 12 wherein said sensor assembly is further responsive to an array of electromagnetic sources mounted to said workpiece.

14. A robot programming system as claimed in claim 1 wherein said sensor assembly comprises a measurement arm and wherein said artificial tool is mounted to said measurement arm.

15. A robot programming system as claimed in claim 1 further comprising a position and orientation selector operative to designate said discrete artificial tool positions and orientations for transfer to said programming computer.

16. A robot programming system as claimed in claim 15 wherein said selector comprises an electronic switch incorporated in said sensor assembly.

17. A robot programming system as claimed in claim 1 wherein said artificial tool includes a physical representation of a robot tool control point.

18. A robot programming system as claimed in claim 1 wherein said artificial tool is dimensionally representative of one of an arc welding tool, a laser tool, a materials dispensing tool, and a water jet tool.

19. A robot programming system as claimed in claim 1 wherein said programming computer is further operative to display said variable virtual robot configuration and create said robot job data file off line from a robot to be programmed.

20. A robot programming system comprising:

a teaching reference frame;

a simulated work cell configuration including a tangible artificial tool, wherein the position and orientation of said artificial tool relative to said teaching reference frame is variable;

a sensor assembly operative to sense said position and said orientation of said artificial tool relative to said teaching reference frame wherein said sensor assembly comprises at least one electromagnetic source;

at least one electromagnetic sensor positioned to receive electromagnetic radiation from said at least one electromagnetic source; and a sensor assembly controller operative to convert said received electromagnetic radiation to a artificial tool position/orientation signal; and a programming computer in communication with said sensor assembly and programmed to display a variable virtual robot configuration based upon the sensed position and orientation of said artificial tool, receive discrete artificial tool positions and orientations from said sensor assembly, and create a robot job data file including said discrete artificial tool positions and orientations.

21. A method for programming a robot off-line comprising the steps of:

positioning and orienting a tangible artificial tool relative to a tangible artificial workpiece in a simulated work cell configuration so as to define a varying artificial tool position and orientation;

providing a mounting structure fixing the position and orientation of said artificial workpiece relative to a teaching reference frame via said mounting structure;

sensing said varying artificial tool position and orientation, wherein said varying artificial tool position and orientation includes discrete artificial tool positions and orientations;

displaying a variable virtual robot configuration based upon said sensed position and orientation of said artificial tool;

receiving said discrete artificial tool positions and orientations from said sensor assembly;

creating a robot job data file including said discrete artificial tool positions and orientations;

transferring said robot job data file to the controller of a robot;

transferring said mounting structure to a robot reference frame;

fixing the position and orientation of said mounting structure to said robot reference frame; and securing an actual workpiece to said mounting structure such that the position and orientation of the artificial workpiece relative to said teaching reference frame corresponds to the position and orientation of the actual workpiece relative to the robot reference frame.

22. A method for programming a robot off-line as claimed in claim 21 wherein said displaying step is further characterized by display of said variable virtual robot configuration substantially in real time relative to movement of said artificial tool.

23. A method for programming a robot off-line as claimed in claim 21 wherein said step of displaying said virtual robot configuration includes displaying a virtual representation of a robot tool and an associated virtual representation of a workpiece.

24. A method for programming a robot off-line as claimed in claim 21 further comprising the step of designating said discrete artificial tool positions and orientations for transfer to said programming computer by activating a position and orientation selector.

25. A method for programming a robot off-line as claimed in claim 21 wherein said discrete artificial tool positions and orientations represent a succession of robot tool positions and orientations necessary for completion of a robot job.

26. A method for programming a robot off-line as claimed in claim 21 further comprising the step of monitoring the display of said variable virtual robot configuration to detect collisions, interferences, and path limitations associated with of a potential tool path within a specific robot configuration.

27. A method for programming a robot off-line as claimed in claim 21 further comprising the step of associating additional robot functions with said discrete artificial tool positions and orientations.

28. A robot programming system comprising:

a simulated work cell configuration including a tangible artificial tool and a tangible artificial workpiece, wherein the position and the orientation of said artificial tool relative to said workpiece is variable;

a sensor assembly operative to sense said position and said orientation of said artificial tool wherein said sensor assembly comprises at least one electromagnetic source, at least one electromagnetic sensor positioned to receive electromagnetic radiation from said at least one electromagnetic source, and a sensor assembly controller operative to convert said received electromagnetic radiation to a artificial tool position/orientation signal; and a programming computer in communication with said sensor assembly and programmed to display a variable virtual robot configuration based upon the sensed position and orientation of said artificial tool, receive discrete artificial tool positions and orientations from said sensor assembly, and create a robot job data file including said discrete artificial tool positions and orientations.

* * * * *